(12) United States Patent
Karp et al.

(10) Patent No.: US 8,214,638 B1
(45) Date of Patent: Jul. 3, 2012

(54) USING MULTIPLE CERTIFICATES TO DISTRIBUTE PUBLIC KEYS

(75) Inventors: Alan Karp, Palo Alto, CA (US); Tyler Close, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1566 days.

(21) Appl. No.: 11/535,470

(22) Filed: Sep. 26, 2006

(51) Int. Cl.
*H04L 9/30* (2006.01)
(52) U.S. Cl. .................. 713/157; 713/158; 380/285
(58) Field of Classification Search .................. 713/156, 713/157, 158, 168, 173, 175, 176, 171, 151; 380/278, 282, 283, 285
See application file for complete search history.

(56) References Cited

U.S. PATENT DOCUMENTS

| | | | | |
|---|---|---|---|---|
| 7,412,524 B1 * | 8/2008 | Gupta et al. | .................. | 709/229 |
| 2002/0116646 A1 * | 8/2002 | Mont et al. | .................... | 713/201 |
| 2003/0188156 A1 * | 10/2003 | Yasala et al. | .................. | 713/156 |
| 2005/0120203 A1 * | 6/2005 | Yeh et al. | .................. | 713/156 |
| 2007/0116269 A1 * | 5/2007 | Nochta | .......................... | 380/30 |

* cited by examiner

*Primary Examiner* — Gilberto Barron, Jr.
*Assistant Examiner* — Izunna Okeke

(57) ABSTRACT

A source computer is associated with multiple certificates. The source signs each certificate with a separate private key. From time to time, the source generates (a) new key pair(s) to replace (an) old one(s). The source uses the new private key(s) to sign the associated certificate(s). The source then requests a connection to a destination computer, the request being associated with the multiple certificates which identify the source. The source also transmits the new public key(s). The destination receives the request, and checks the certificates for validity. If less than all but at least a threshold number of the certificates are valid, the destination notes that one or more new public keys are being distributed. The destination accepts the connection, receives the new public key(s) associated with the invalid certificate(s), and replaces the corresponding old public key(s).

17 Claims, 3 Drawing Sheets

USING MULTIPLE CERTIFICATES TO DISTRIBUTE PUBLIC KEYS

TECHNICAL FIELD

This invention pertains generally to key pair cryptography, and more specifically to using multiple certificates to distribute public keys.

BACKGROUND

Public/private key pairs are commonly used for secure communication and to provide identification. A problem with key pair cryptography is the difficulty of knowing that a particular public key actually corresponds to the party one thinks it does. Two approaches are to use a certificate authority, such as Verisign, or to use a web of trust, as recommended by OpenPGP.

Unfortunately, it is often necessary to change a private/pubic key pair. For example, private keys often need to be revoked, either because they are no longer secret or because they have expired. Most private keys expire after a set period of time, such as one year, because the longer a private key is in use, the greater the chance that it will be compromised. Unfortunately, some uses of the key must survive this change. It is important to maintain the trust relationship associated with the old key when moving to a new key.

One standard approach to changing private keys is to sign a certificate that validates the new key with the old key it replaces. Once the certificate is issued and widely accepted, the old key can be revoked or allowed to expire. This process can be continued in order to issue new private keys over time. A problem with this approach is that the entire future chain of such certificates is vulnerable to the loss of a single private key in the sequence. Should any of the private keys be compromised, the rest of the chain starting at that point is not secure. Note also that this procedure only works as long as the user connects while the old key is still valid.

Another approach is to sign a certificate that validates the new key with a closely held private key. If the signing key is carefully protected, it can be used for a very long time. For example, Verisign's closely held private key has a 30 year lifespan. A problem with this approach is that anyone using it is vulnerable to the signing authority. This authority could raise its price for a new key or could fraudulently issue new private keys. In the event of a dispute over ownership of a resource controlled by the private key, the signing authority would have full control.

What is needed is a system and a method to allow the changing of private keys without the problems described above.

SUMMARY OF INVENTION

Computer systems and computer-implemented methods use multiple certificates to distribute new public keys. A source computer is associated with a plurality of certificates. The source computer signs each of the certificates with a separate private key. From time to time, the source computer generates at least one new private/public key pair, and replaces an associated, old private/public key pair therewith. For each new private key, the source computer signs the associated certificate with that new private key. The source computer then transmits a request for a secure connection to a destination computer, the request being associated with the plurality of certificates, such that the plurality of certificates identifies the source of the request. For each new private key, the source computer also transmits the corresponding new public key such that the new public key is associated with the corresponding certificate.

Conversely, the destination computer receives the request for a secure connection from the source computer. The request is associated with a plurality of certificates, each of which is signed with a separate private key. The destination computer checks each of the certificates for validity. If the certificates are all valid, the destination computer accepts the request for the secure connection. If none of the certificates are valid, the destination computer rejects the request. If less than all but at least a threshold number of the certificates are valid, the destination computer notes that one or more new public keys are being distributed. In this case, the destination computer accepts the request, and, for each invalid certificate, 1) receives an associated new public key and 2) replaces a corresponding old public key with the received new public key.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
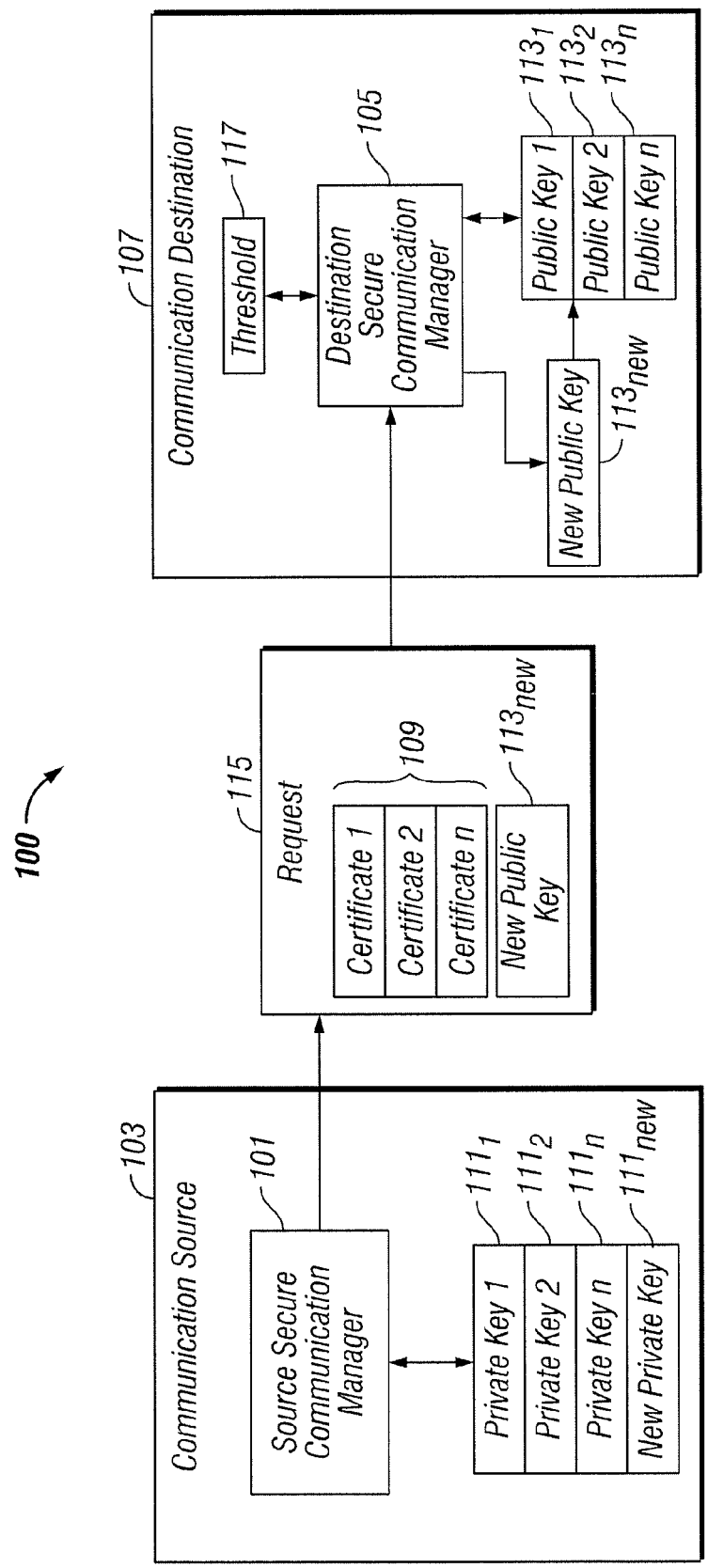
FIG. 1 is a block diagram illustrating a high level overview of a system for the operation of one embodiment of the present invention.

FIG. 1 illustrates an example system 100 in which an embodiment of the present invention can operate. A source secure communication manager 101 runs on a communication source 103, and a destination secure communication manager 105 runs on a communication destination 107. As explained in greater detail below, the communication source 103 and destination 107 use multiple certificates 109 to confirm the identity of the source 103 and for the distribution of new public keys 113, and thus allow secure communication, even where an associated private key 111 is no longer valid.

The communication source 103 and destination 107 comprise computing devices, such as programmable general purpose computers. It is to be understood that although the source and destination secure communications managers 101 105 are illustrated as single entities, as the term is used herein, "secure communication manager" 101 105 refers to a collection of functionalities which can be implemented as software, hardware, firmware or any combination of these. Where a secure communication manager 101 105 is implemented as software, it can be implemented as a standalone program, but can also be implemented in other ways, for example as part of a larger program or as a plurality of separate programs. Whether a secure communication manager 101 105 is implemented as software, hardware, firmware or a combination of the three, it can be implemented as one or more modules as desired.

It is to be understood that FIG. 1 illustrates an example of a system 100 on which an embodiment of the present invention can execute, but as will be apparent to those of ordinary skill in the relevant art, many variations on the system 100 are possible and are within the scope of the present invention. For example, the illustrated components can be distributed in other ways and/or can be centralized or localized. The various computing devices illustrated are only examples, and different, more, or fewer computing devices are utilized in other embodiments.

For clarity, FIG. 1 illustrates a single communication source 103 securely communicating with a single destination 107. However, any number of communication sources 103 and destinations 107 can securely communicate according to various embodiments of the present invention. It is also to be understood that a single computing device can function as both a source 103 and a destination 107. In some embodiments, each source 103 distributes new public keys 113 to a plurality of destinations 107. As explained in greater detail below, various numbers of certificates 109 and corresponding private 111 and public keys 113 can also be utilized in various embodiments. The number of certificates 109 and corresponding keys 111 113 illustrated in FIG. 1 is an example only.

As illustrated in FIG. 1, instead of associating an identification (i.e., the identification of a communication source 103) with a single certificate 109, the identification is associated with multiple certificates 109, each of which is signed with a corresponding private key 111. When a source secure communication manager 101 running on a communication source 103 transmits a request 115 to establish a secure connection to a communication destination 107, the source secure communication manager 101 presents all of its associated certificates 109. In one embodiment, if all are valid (i.e., each certificate is signed by a private key 111 corresponding to a public key 113 in the possession of the destination 107), the destination secure communication manager 105 accepts the request 115 and no further action is taken. If none are valid, the destination secure communication manager 105 rejects the request 115. In other embodiments, not all certificates 109 need to be invalid for the destination secure communication manager 105 to reject the connection request 115. In such embodiments, if less than a threshold number 117 of the certificates 109 (e.g., the total number of certificates 109 minus a constant such as 1 or 2) are invalid, the destination secure communication manager 105 rejects the request 115. In any case, if less than all but at least a threshold number 117 of the certificates 109 are valid, the destination secure communication manager 105 notes that at least one private key 111 has been revoked or expired, and that a corresponding replacement public key 113 is being distributed.

More specifically, when a private key 111 has expired or is otherwise revoked, the source secure communication manager 101 generates a replacement private/public key pair 111 113. The source secure communications manager 101 then uses the new private key 111 to sign the certificate 109 associated with the companion new public key 113. The source secure communication manager 101 then transmits the replacement public key $113_{NEW}$ with the request 115 for a secure connection. Because the key pair 111, 115 has been updated, the corresponding certificate 109 will no longer be valid. However, because the requisite number of other certificates 109 are still valid, the destination secure communication manager 105 accepts the request 115. The invalid certificate 109 in the company of the requisite number of valid certificates 109 is interpreted by the destination secure communication manager 105 as an indication that the public key corresponding to the invalid certificate 109 is a new, replacement public key $113_{NEW}$, being distributed by the source secure communication manager 101. The destination secure communication manager 105 thus replaces its corresponding old public key (e.g., $113_1$) with the new public key $113_{NEW}$. The destination secure communication manager 105 can be confident that the replacement public key $113_{NEW}$ is legitimate and safe to use because the requisite number of certificates 109 are valid. When a new public key $113_{NEW}$ is thus distributed, it is subsequently used in place of its predecessor. Note that the mere presence of a given number of recognized certificates 109 is sufficient to validate the other(s).

It is to be understood that the threshold number 117 is a variable design parameter that can be set as desired. The threshold 117 is typically mapped to the number of certificates 109 used, which is also a variable design parameter. In one embodiment, a number N certificates 109 are used, and the threshold 117 equals N−1. In one version of this embodiment two certificates 109 are used (i.e., N=2) and thus the threshold 117 equals 1. In another embodiment, the number of certificates 109 is greater than two, but the threshold number 117 still equals 1. Other possibilities exist and are within the scope of the present invention. Thus, as will be apparent to those of ordinary skill in the relevant art, the present invention can be used to distribute one or more new public keys 113 in a single transmission.

Note that new public keys 113 need to be distributed while at least one (or more than one in some embodiments) of the private keys 111 are still valid. Otherwise, the requisite number of certificates 109 would no longer be valid, and the request 115 for the secure connection would be denied. Hence, adding additional certificates 109 to the scheme increases the level of security. If N certificates 109 are used, an attacker would have to steal N−x private keys 111 to fool a destination secure communication manager 105, where N−x=the threshold number 117. Also, for additional security, the source secure communications manager 101 can set private keys 111 used to sign certificates 109 to expire over a staggered period of time. If K of these private keys 111 have expired, an attacker would have to steal the last N—K−x keys 111 to mount a successful attack.

Figure 2:
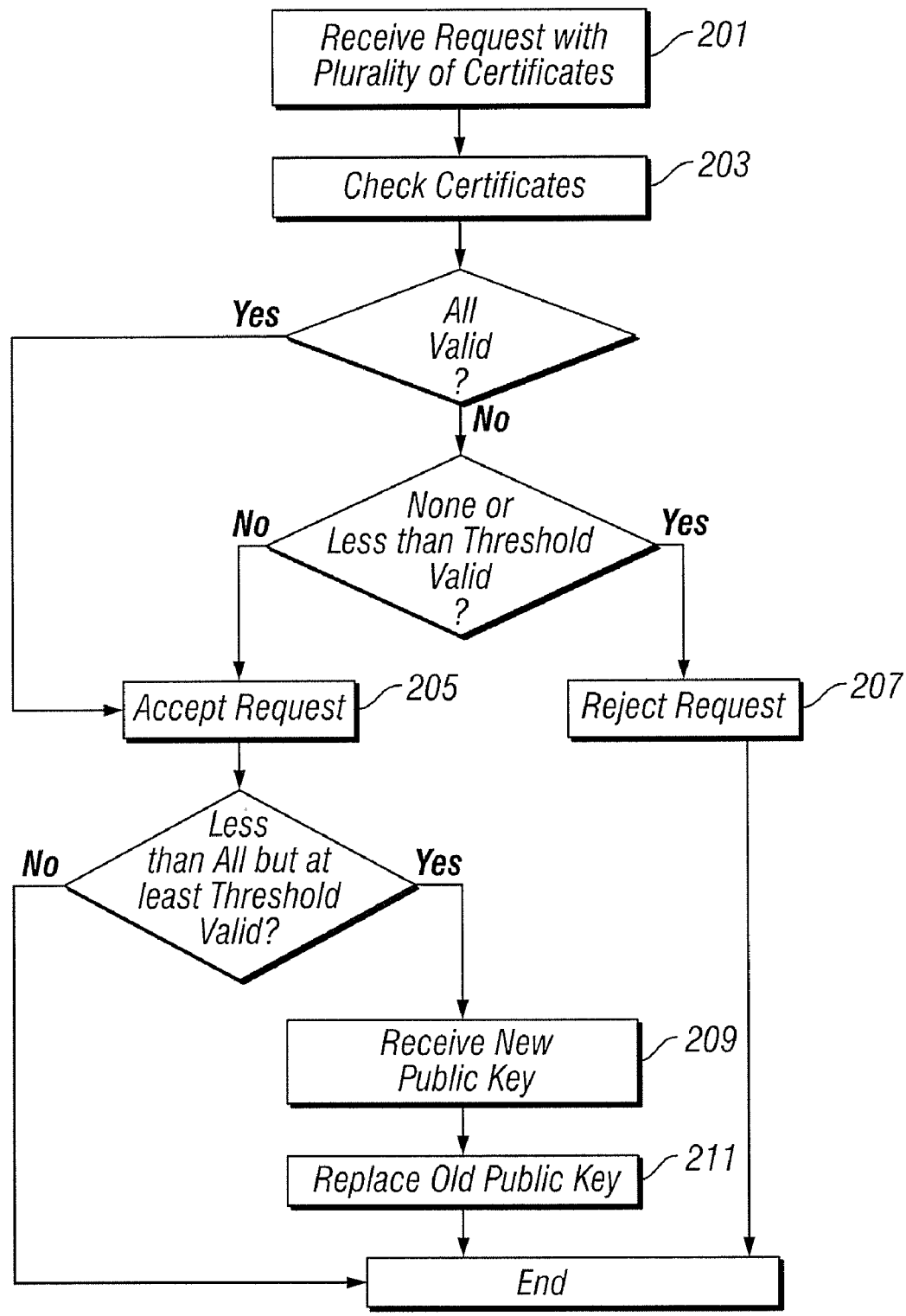
FIG. 2 is a flowchart illustrating steps for receiving new public keys, according to some embodiments of the present invention.

FIG. 2 illustrates a method for receiving new public keys $113_{NEW}$ according to some embodiments of the present invention. For illustrative purposes and not to be limiting thereof, FIG. 2 is discussed in the context of the destination secure communications manager 105 of FIG. 1. As illustrated by FIG. 2, the destination secure communications manager 105 receives 201 a request 115 for a secure connection from a source computer 103. As explained above, the request 115 is associated with a plurality of certificates 109, each of which is signed with a separate private key 111. The destination secure communications manager 105 checks 203 each of the certificates 109 for validity.

If the certificates 109 are all valid, the destination secure communications manager 105 accepts 205 the request 115 for the secure connection. If none of the certificates 109 are valid, the destination secure communications manager 105 rejects 207 the request 115. In some embodiments, the destination secure communications manager 105 rejects 207 the request 115 even if some of the certificates 109 are valid, provided that the number of valid certificates 109 is less than a threshold number 119. However, if less than all but at least a threshold number 117 of the certificates 109 are valid, the destination secure communications manager 105 accepts 205 the request 115 for the secure connection, and, for each invalid certificate 109, 1) receives 209 an associated new public key $113_{NEW}$ and 2) replaces 211 a corresponding old public key 113 with the received new public key 113.

Figure 3:
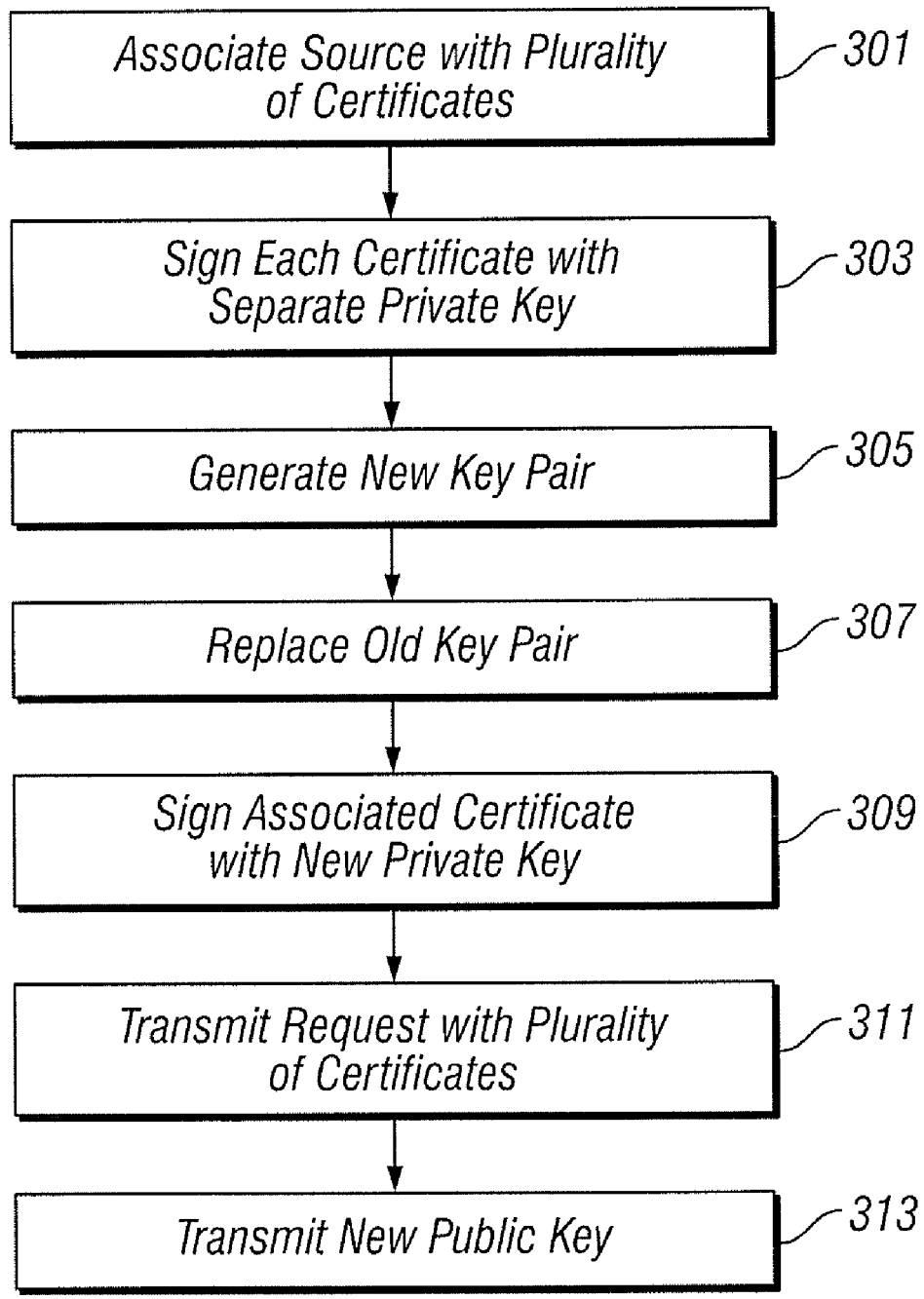
FIG. 3 is a flowchart illustrating steps for generating and transmitting new public keys, according to some embodiments of the present invention.

FIG. 3 illustrates a method for generating and transmitting new public keys $113_{NEW}$ according to some embodiments of the present invention. For illustrative purposes and not to be limiting thereof, FIG. 3 is discussed in the context of the source secure communications manager 101 of FIG. 1. As illustrated by FIG. 3, the source secure communications manager 101 associates 301 a communication source 102 with a plurality of certificates 109. The source secure communications manager 101 signs 303 each of the certificates 109 with a separate private key 111. From time to time, the source secure communications manager 101 generates 305 at least one new private/public key pair $111_{NEW}113_{NEW}$, and replaces 307 an associated, old private/public key pair (e.g., $111_1$ $113_1$) therewith. For each new private key $111_{NEW}$, the source secure communications manager 101 signs 309 the associated certificate 109 with that new private key $111_{NEW}$. The source secure communications manager 101 then transmits 311 a request 115 for a secure connection to a destination 107, the request 115 being associated with the plurality of certificates 109, such that the plurality of certificates 109 identifies the source 103 of the request 115. For each new private key $111_{NEW}$, the source secure communications manager 101 also transmits 313 the corresponding new public key $113_{NEW}$ such that the new public key $113_{NEW}$ is associated with the corresponding certificate 109.

Thus, the present invention allows the replacement of private keys 111 without vulnerability to a single party. Additionally, the present invention protects against attacks even when a private key 111 has been revoked because it has been compromised.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

What is claimed is:

1. A computer implemented method for secure electronic communication, the method comprising the steps of:
   receiving a single request for a secure connection from a source, the single request being associated with each of a plurality of certificates, such that the plurality of certificates identifies the source of the single request, and each of which is signed by the source with a separate private key;
   checking each of the certificates for validity; and
   responsive to results of the checking step, determining whether to accept the request for the secure connection.

2. The method of claim 1 wherein determining whether to accept the single request for the secure connection responsive to results of the checking step further comprises performing a step from a group of steps consisting of:
   responsive to determining that all of the certificates are valid, accepting the single request for the secure connection;
   responsive to determining that none of the certificates are valid, rejecting the single request for the secure connection;
   responsive to determining that less than a threshold number of the certificates are valid, rejecting the single request for the secure connection; and
   responsive to determining that less than all but at least a threshold number of the certificates are valid, accepting the single request for the secure connection, and,
   for each invalid certificate, 1) receiving an associated new public key and 2) replacing a corresponding old public key with the received new public key.

3. The method of claim 2 wherein:
   the plurality of certificates consists of a number N of certificates; and
   the threshold number equals N−1.

4. The method of claim 3 wherein:
   N equals 2.

5. The method of claim 2 wherein:
   the threshold number equals 1.

6. A computer implemented method for secure electronic communication, the method comprising the steps of:
   associating a communication source with a plurality of certificates of the communication source;
   signing, by the communications source, each of the plurality of certificates with a separate private key;
   transmitting a single request for a secure connection from the source to a destination, the single request being associated with each of the plurality of certificates, such that the plurality of certificates identifies the source of the single request;
   generating at least one new private/public key pair, so as to replace an associated, old private/public key pair;
   for each new private key, signing an associated certificate with that new private key; and
   transmitting a single request for a secure connection from the source to a destination, the request being associated with each of the plurality of certificates and, for each new private key, transmitting, while at least one old private key is valid, the corresponding new public key such that the new public key is associated with the corresponding certificate.

7. The method of claim 6 further comprising performing a step from a group of steps consisting of:
   generating at least one new private/public key pair responsive to an associated, old private key expiring; and
   generating at least one new private/public key pair responsive to an associated old private key being compromised.

8. The method of claim 6 further comprising:
generating a plurality of private/public key pairs over a staggered time interval; and
for each previously generated private/public key pair, 1) generating a new private/public key pair within a set period of time from the generation of the previously generated private/public key pair and 2) replacing the previously generated private/public key pair with the new private/public key pair.

9. A computer system, including a processor to execute a number of modules, for secure electronic communication, the computer system comprising:
a module that associates a communication source with a plurality of certificates of the communication source;
a module that signs each of the plurality of certificates, by the communication source, with a separate private key;
a module that transmits a single request for a secure connection from the source to a destination, the single request being associated with each of the plurality of certificates, such that the plurality of certificates identifies the source of the single request;
a module configured to generate at least one new private/public key pair, so as to replace an associated, old private/public key pair;
a module configured to sign, for each new private key, an associated certificate with that new private key; and
a module configured to transmit a single request for a secure connection from the source to a destination, the single request being associated with each of the plurality of certificates and to transmit while at least one old private key is valid, for each new private key, the corresponding new public key such that the new public key is associated with the corresponding certificate.

10. The computer system of claim 9 further comprising a module configured to execute a step from a group of steps consisting of:
generating at least one new private/public key pair responsive to an associated, old private key expiring; and
generating at least one new private/public key pair responsive to an associated old private key being compromised.

11. The computer system of claim 9 further comprising:
a module configured to generate a plurality of private/public key pairs over a staggered time interval;
a module configured to, for each previously generated private/public key pair, 1) generate a new private/public key pair within a set period of time from the generation of the previously generated private/public key pair and 2) replace the previously generated private/public key pair with the new private/public key pair.

12. A computer system for secure electronic communication, the computer system comprising:
a module, executed by the computer system, that receives a single request for a secure connection from a source, the single request being associated with each of a plurality of certificates, such that the plurality of certificates identifies the source of the single request, and each of which is signed by the source with a separate private key;
a module, executed by the computer system, that checks each of the certificates of the plurality for validity; and
a module, executed by the computer system, that determines whether to accept the single request for the secure connection, responsive to results of checking each of the certificates of the plurality for validity.

13. The computer system of claim 12 wherein the module configured to determine whether to accept the single request for the secure connection responsive to results of checking each of the certificates of the plurality for validity is further configured to perform a step from a group of steps consisting of:
responsive to determining that all of the certificates are valid, accepting the single request for the secure connection;
responsive to determining that none of the certificates are valid, rejecting the single request for the secure connection;
responsive to determining that less than a threshold number of the certificates are valid, rejecting the single request for the secure connection; and
responsive to determining that less than all but at least a threshold number of the certificates are valid, accepting the single request for the secure connection, and, for each invalid certificate, 1) receiving an associated new public key and 2) replacing a corresponding old public key with the received new public key.

14. The computer system of claim 13 wherein:
the plurality of certificates consists of a number N of certificates; and
the threshold number equals N−1.

15. A computing device for secure electronic communication having a computer processor and computer-readable program code stored on a non-transitory computer readable medium and executable by the computer processor, wherein the computer-readable program code comprises:
program code for associating a communication source with a plurality of certificates of the communication source;
program code for signing, by the communications source, each of the plurality of certificates with a separate private key;
program code for transmitting a single request for a secure connection from the source to a destination, the single request being associated with each of the plurality of certificates, such that the plurality of certificates identifies the source of the single request;
program code for generating at least one new private/public key pair, so as to replace an associated, old private/public key pair;
program code for signing, for each new private key, an associated certificate with that new private key; and
program code for transmitting a single request for a secure connection from the source to a destination, the single request being associated with each of the plurality of certificates and, for each new private key, transmitting, while at least one old private key is still valid, the corresponding new public key such that the new public key is associated with the corresponding certificate.

16. The computing device of claim 15, wherein the computer-readable code in the non-transitory computer readable medium further comprises program code for performing a step from a group of steps consisting of:
generating at least one new private/public key pair responsive to an associated, old private key expiring; and
generating at least one new private/public key pair responsive to an associated old private key being compromised.

17. The computing device of claim 15 further comprising:
program code for generating a plurality of private/public key pairs over a staggered time interval; and
program code for, for each previously generated private/public key pair, 1) generating a new private/public key pair within a set period of time from the generation of the previously generated private/public key pair and 2) replacing the previously generated private/public key pair with the new private/public key pair.

* * * * *